United States Patent [19]
Dee et al.

[11] Patent Number: 5,963,401
[45] Date of Patent: Oct. 5, 1999

[54] MAGNETIC TAPE HEAD ASSEMBLY INCLUDING MODULES HAVING A PLURALITY OF MAGNETO-RESISTIVE HEAD ELEMENTS

[75] Inventors: Richard H. Dee; James C. Cates, both of Louisville, Colo.

[73] Assignee: Storage Technology Corporation, Louisville, Colo.

[21] Appl. No.: 08/939,773

[22] Filed: Sep. 29, 1997

[51] Int. Cl.⁶ .................................................. G11B 5/127
[52] U.S. Cl. .......................................................... 360/113
[58] Field of Search ................................. 360/113, 119, 360/121, 122, 129

[56] References Cited

U.S. PATENT DOCUMENTS

| | | | |
|---|---|---|---|
| 3,940,797 | 2/1976 | Brock et al. | 360/113 |
| 4,375,656 | 3/1983 | Radman, Jr. et al. | 360/122 |
| 4,479,158 | 10/1984 | Froehlich et al. | 360/130.1 |
| 4,589,042 | 5/1986 | Anderson | 360/125 |
| 4,685,005 | 8/1987 | Fields, Jr. | 360/121 |
| 5,034,838 | 7/1991 | Brock et al. | 360/122 |
| 5,142,768 | 9/1992 | Aboaf et al. | 360/119 |
| 5,203,119 | 4/1993 | Cole | 451/11 |
| 5,220,473 | 6/1993 | Brock et al. | 360/122 |
| 5,264,981 | 11/1993 | Campbell et al. | 360/126 |
| 5,293,285 | 3/1994 | Leonhardt et al. | 360/130.21 |
| 5,296,993 | 3/1994 | Aboaf et al. | 360/126 |
| 5,302,461 | 4/1994 | Anthony | 428/472 |
| 5,345,341 | 9/1994 | Durland | 360/121 |
| 5,539,598 | 7/1996 | Denison et al. | 360/113 |
| 5,602,703 | 2/1997 | Moore et al. | 360/121 |
| 5,666,246 | 9/1997 | Gill et al. | 360/113 |
| 5,751,527 | 5/1998 | Sundaram et al. | 360/122 |

OTHER PUBLICATIONS

F. William Hahn, Jr., *Historical Perspective of Tape Head Contours,* IBM Corporation, Tucson, Arizona.

Richard Dee and James Cates, *Designing write heads for high–density tape,* Data Storage, pp. 43–48, Oct. 1996.

Brahim Lekmine, *Recording Channel and Data Detection in Magnetic Tape Drives,* Proceedings, SPIE–The International Society for Optical Engineering, High Density Data Recording and Retrieval Technologies, Oct. 23–24, 1995, vol. 2604, pp. 176–191.

Richard C. Schneider, *Design Methodology for High Density Read Equalization,* Proceedings, SPIE–The International Society for Optical Engineering, High Density Data Recording and Retrieval Technologies, Oct. 23–24, 1995, vol. 2604, pp. 200–209.

Priyadarshee et al., *Survey of digital transport servo systems,* Proceedings, SPIE–The International Society for Optical Engineering, High Density Data Recording and Retrieval Technologies, Oct. 23–24, 1995, vol. 2604, pp. 210–217.

(List continued on next page.)

*Primary Examiner*—David D. Davis
*Attorney, Agent, or Firm*—Brooks & Kushman P.C.

[57] ABSTRACT

A magnetic tape head assembly is disclosed for use with a magnetic tape storage medium. The assembly includes an interior tape head module having a magnetic gap with 18 tape head elements, and a first exterior tape head module adjacent to one side of the interior tape head module, the first exterior tape head module having a magnetic gap with 18 tape head elements. The assembly also includes a second exterior tape head module adjacent to the other side of the interior tape head module, the second exterior tape head module having a magnetic gap with 18 tape head elements. The distances between consecutive magnetic gaps of the interior and exterior modules are each approximately 0.150 inches, the interior and exterior modules together define a tape interface contour, and the tape head assembly is capable of writing and reading a high coercivity, high density metal particle tape media, and reading a low density $CrO_2$ tape media. In the preferred embodiment, the interior module is a write head with 18 write elements, and the exterior modules are each read heads with 18 read elements.

20 Claims, 3 Drawing Sheets

OTHER PUBLICATIONS

Eric Baugh et al., *Head/tape interface,* Proceedings, SPIE–The International Society for Optical Engineering, High Density Recording and Retrieval Technologies, Oct. 23–24, 1995, vol. 2604, pp. 158–164.

James A. Bain, *Recording heads: write heads for high–density magnetic tape,* SPIE–The International Society for Optical Engineering, High Density Data Recording and Retrieval Technologies, Oct. 23–24, 1995, vol. 2604, pp. 165–175.

Jim Eaton, *Magnetic tape trends and futures,* Proceedings, SPIE–The International Society for Optical Engineering, High Density Data Recording and Retrieval Technologies, Oct. 23–24, 1995, vol. 2604, pp. 146–157.

Henk Hoeve, Digital Compact Cassette, Digital Consumer Electronics, pp. 23.1–23.12, 1997.

MAGNETIC TAPE HEAD ASSEMBLY INCLUDING MODULES HAVING A PLURALITY OF MAGNETO-RESISTIVE HEAD ELEMENTS

TECHNICAL FIELD

The present invention relates to a magnetic tape head assembly with multiple tape head modules designed for bi-directional, high speed, high density tape storage applications.

BACKGROUND ART

An important and continuing goal in the data storage industry is that of increasing the density of data stored on a medium. For tape storage systems, that goal has lead to increasing the track density in recording tape heads, and decreasing the thickness of the magnetic tape medium. However, the development of small footprint, higher performance tape drive systems has created various problems in the design of a tape head assembly for use in such systems.

Such problems include multi-track, high density recording on high coercivity tape media. However, compatibility with conventional tape media is also a problem. In addition to the higher coercivity, higher density tape media, tape head assemblies should also read conventional track formats on $CrO_2$ tapes recorded at lower linear densities. $CrO_2$ tape is abrasive and can lead to excessive wear and rapid preferential pole erosion on thin film write elements.

In addition, tape head assemblies must perform read while write operation in both forward and backward direction of tape motion at high tape speeds. Moreover, tape head assemblies must be moveable perpendicular to the direction of tape motion to allow multiple passes of the tape with the head in different cross tape locations.

Thus, there exists a need for a multi-element, thin film tape head assembly for use in a tape drive that will use high coercivity half-inch tape (e.g., >1600 Oe coercivity metal particle media) and a high recording density (e.g., >50 kfci base with write equalization). Such a tape head assembly would perform read while write operation in both forward and backward direction of tape motion at a tape speed of between approximately 1 and 4 m/s, and would be moveable perpendicular to the direction of tape motion to allow multiple passes of the tape. Still further, such a tape head assembly would include 18 tape head elements on an approximately 630 μm pitch, such that the tape head assembly would be capable of reading old format 18 and 36 track $CrO_2$ tapes recorded at a lower linear density (25 kfci).

SUMMARY OF THE INVENTION

Accordingly, a principle object of the present invention is to provide an improved bi-directional, multi-gap, high density tape head assembly that operates at high speed.

According to the present invention, then, a magnetic tape head assembly is provided for use with a magnetic tape storage medium. The assembly comprises an interior tape head module having a magnetic gap provided therein, the interior module having 18 tape head elements along the magnetic gap, and a first exterior tape head module having a magnetic gap provided therein, the first exterior module being disposed adjacent one side of the interior module, the first exterior module having 18 tape head elements along the magnetic gap. The assembly further comprises a second exterior tape head module having a magnetic gap provided therein, the second exterior module being disposed adjacent to another side of the interior module, the second exterior module having 18 tape head elements along the magnetic gap. The distances between consecutive magnetic gaps of the interior and exterior modules are each approximately 0.150 inches (0.38 Centimeters), the interior and exterior modules together define a tape interface contour, and the tape head assembly is capable of writing and reading a high coercivity, high density metal particle tape media, and reading a low density $CrO_2$ tape media.

These and other objects, features and advantages will be readily apparent upon consideration of the following detailed description in conjunction with the accompanying drawings.

DETAILED DESCRIPTION OF THE INVENTION

Figure 1:
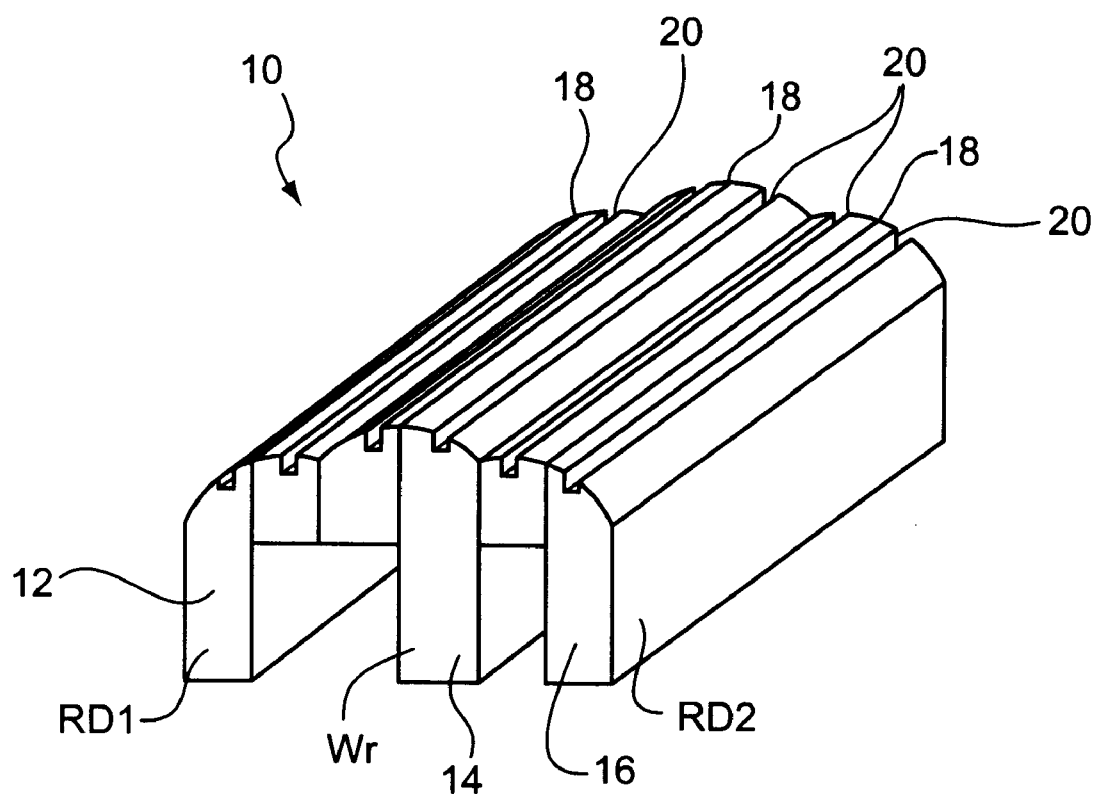
FIG. 1 is a perspective view of one embodiment of the multi-track, bi-directional thin film tape head assembly of the present invention.
Figure 2:
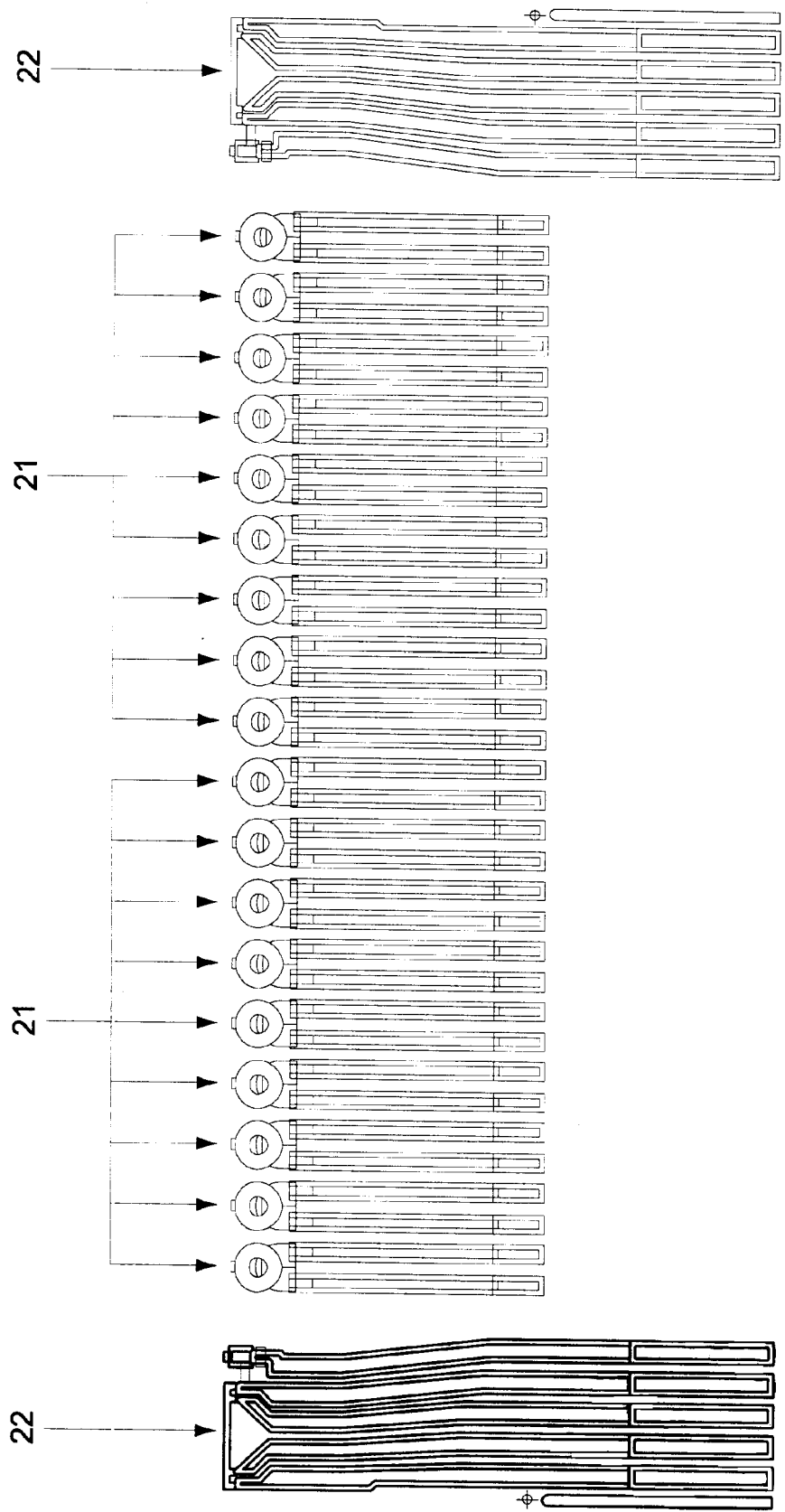
FIG. 2 is a top view of a multi-element, thin film write head for use in the present invention.
Figure 3:
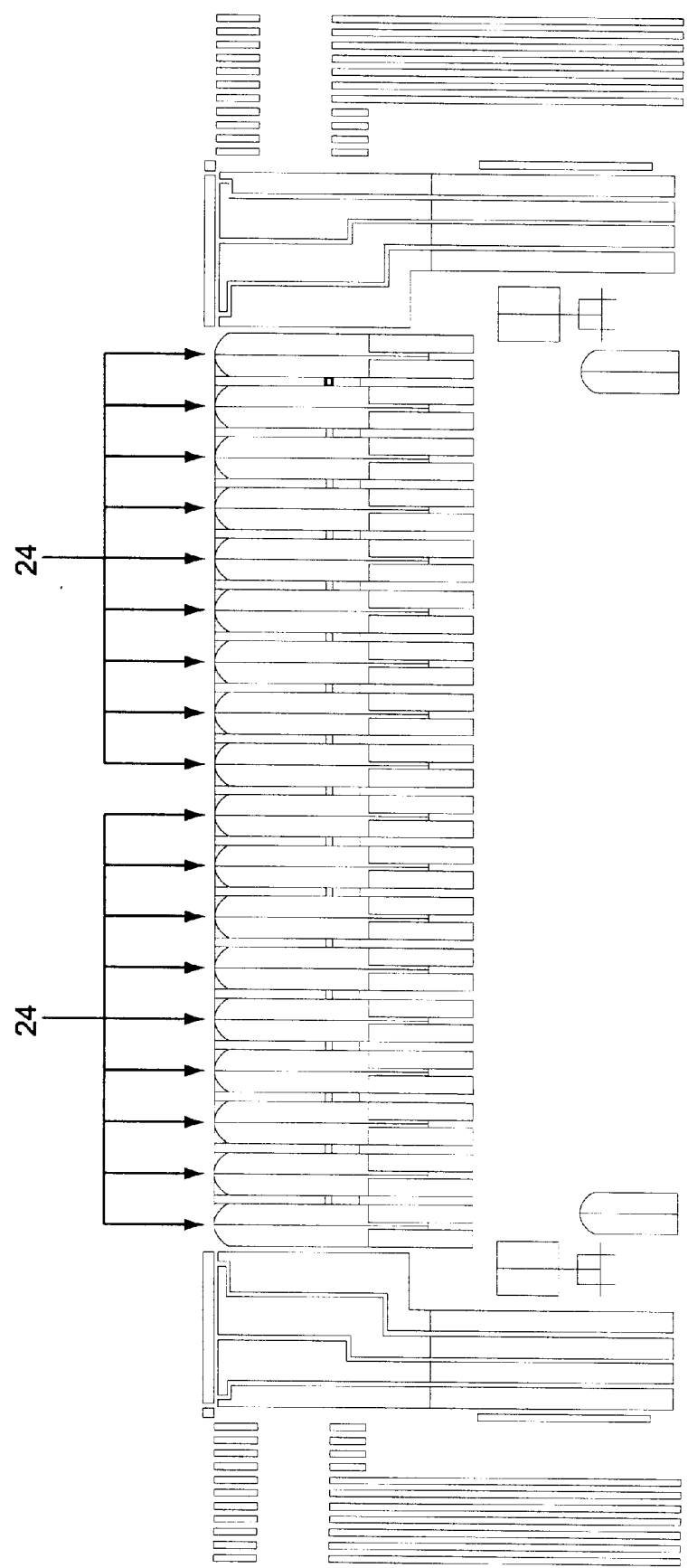
FIG. 3 is a top view of a multi-element, thin film read head for use in the present invention.

Referring now to FIGS. 1–3, the preferred embodiment of the present invention will now be described in detail. In that regard, FIG. 1 is a perspective view of one embodiment of the multi-element, bi-directional thin film tape head assembly of the present invention, denoted generally by reference numeral 10.

As seen therein, tape head assembly (10) is a three segment head comprising a first exterior tape head module (12), an interior tape head module (14), and a second exterior tape head module (16), each including 18 tape head elements (not shown). As used herein, a tape head element may be either a read or a write element.

Preferably, tape head assembly (10) is a three segment head comprising a first read head (12), a write head (14), and a second read head (16). In that regard, as will be described in detail below in conjunction with FIGS. 2 and 3, write head (14) contains 18 thin film write elements (not shown) spaced approximately 630 μm apart positioned symmetrically between read heads (12, 16), each containing 18 magneto-resistive (MR) read elements (not shown). In this embodiment, then, tape head assembly (10) is a read/write/read design. While preferred, such a read/write/read design is not required for the present invention.

Still referring to FIG. 1, as is well known in the art, each read and write head (12, 14, 16) includes a magnetic gap (18). In that regard, the spacing between gaps (18) of read head (12) and write head (14), as well as write head (14) and read head (16) (gap-to-gap spacing), is approximately 0.150 inches. The contour of tape head assembly (10) is shaped for bi-directional operation by using cylindrical surfaces and single or multiple transverse air bleed slots (20).

Referring next to FIGS. 2 and 3, top views of multi-element, thin film read and write heads for use in the present invention are shown. In that regard, FIG. 2 depicts write head (14) of FIG. 1, while FIG. 3 depicts read heads (12, 16) of FIG. 1.

As seen in FIG. 2, write head (14) of FIG. 1 includes 18 write elements (21). Each write element (21) is a 6 turn inductive device with Cobalt-Zirconium-Tantalum poles constructed on an Aluminum-Titanium-Carbon or a Nickel- Zinc ferrite base. The latter is preferred as pole tip recession is minimized and the use of ferrite reduces the incidence of tape stick for older $CrO_2$ tapes. The pole width that defines the track width on tape is approximately 105 μm wide and the write gap length is between approximately 0.50 μm and 0.9 μm. Write head (14) also includes lapping sensors (22) at each end thereof.

Similarly, as seen in FIG. 3, read heads (12, 16) of FIG. 1 include 18 read elements (24). Each read element (24) is a Soft Adjacent Layer biased MR element using an Alumina/NiFeCr alloy/Tantalum/NiFe/Alumina structure sandwiched between two Nickel-Zinc ferrite blocks that act as magnetic shields. The active element width is between approximately 30 and 50 μm and the shield-to-shield spacing is between approximately 0.4 and 0.7 μm.

With the configuration depicted in FIGS. 1–3, the tape head assembly of the present invention has the ability to read 25 kfci $CrO_2$ ANSI X3.180 (0,3) code tapes and write and read high density (1,7) and (2,7) code metal particle tapes. In that regard, the requirement of reading $CrO_2$ media recorded at 25 kfci and metal particle media recorded at a density between 50 and 80 kfci with the same soft adjacent layer (SAL) biased read head places constraints on the read design.

More specifically, in order to have proper resolution at high density on MP media and proper pattern detection with the $CrO_2$ media recorded with a 25 kfci, (0,3) code, the read gap should be in the range of 0.4 to 0.7 μm. Moreover, second harmonic distortion during signal readback needs to be low when reading both types of media. This is a particularly sensitive parameter since the readers are single-ended elements without the second harmonic cancellation found in center-tapped MR elements. In addition, the preferred operating conditions in the tape drive include a globally fixed operating bias current for the head, meaning that the bias current for each read track is not adjusted for optimum performance. For these reasons, the read second harmonic distortion needs to be insensitive to track-to-track variation in biasing.

Therfore, the SAL read design in the tape head assembly of the present invention is optimized to produce a wide region of bias conditions with minimal second harmonic distortions. In that regard, in conventional tape head assemblies, a SAL film with very high resistivity is employed to minimize current shunting through the SAL film, which affects the bias of the MR film. The MR film is then placed symmetrically between the two shields to eliminate the biasing affects of the magnetic shields.

In contrast, in the tape head assembly of the present invention, the SAL material employed has significant conductivity. For this reason, the MR film is placed asymmetrically between the shields. This placement of the MR film closer to one permeable shield compensates for the additional transverse bias field due to the current shunting through the SAL film. This in turn leads to a broader range of bias conditions with acceptable second harmonic distortion.

Specifically, in the tape head assembly design of the present invention, the ratio of the magnetic moment (saturation magnetization multiplied by the film thickness) of the SAL film to the MR film is increased to over 0.75 in order to achieve proper biasing. In addition, the MR film thickness is made as thick as possible to minimize second harmonic distortion while maintaining adequate read amplitude. The read stripe height is chosen to ensure adequate head life with the abrasive $CrO_2$ media and with consideration for read amplitude. Thus, for a read track width between 30 and 50 μm, a read head with a stripe height of between 4 and 7 μm with an MR thickness of between 500 and 800 Angstroms stroms is preferred, as such a configuration satisfies the tradeoffs associated with head life, amplitude, and second harmonic distortion. As an example, a 0.5 μm gap, 1900 Angstroms Insulator/680 Angstroms Soft Adjacent Layer/200 Angstroms Tantalum/600 Angstroms Nickel-Ferrite/100 Angstroms Titanium/1450 Angstroms Insulator configuration could be provided.

Moreover, the three tape head modules, each with 18 tracks, provides a unique format capability of up to 144 tracks on a half inch tape. Still further, a Cobalt-Zirconium-Tantalum(CZT) pole on a ferrite base is a low PTR implementation, which is particularly important with tape media. The formation of PTR can be further reduced by laminating the CZT write poles with an appropriate material such as Aluminum Oxide ($Al_2O_3$). For example, a 1 μm CZT/200 Angstrom $Al_2O_3$ configuration could be used.

It should also be noted that the tape head assembly of the present invention is designed for use with various features which are shown and described in U.S. patent application Ser. Nos. 08/943,361 entitled "Recording Head Element With Improved Coil Tap And Method For Manufacturing Same"; and 08/939,937 entitled "Lapping Sensor For Thin Film Recording Elements And Method For Manufacturing Same". Each of those applications are assigned to the assignee of the present application, and are incorporated herein by reference.

As is readily apparent from the foregoing description, then, the present invention provides an improved bi-directional, multi-gap, high density tape head assembly that operates at high speed. More specifically, the present invention provides a multi-element, thin film tape head assembly for use in a tape drive that will use high coercivity half-inch tape (e.g., >1600 Oe coercivity metal particle media) and a high recording density (e.g., >50 kfci base with write equalization). The tape head assembly of the present invention will perform read while write operation in both forward and backward direction of tape motion at a tape speed of between approximately 1 to 4 m/s, and will be moveable perpendicular to the direction of tape motion to allow multiple passes of the tape. Still further, the tape head assembly of the present invention includes 18 tape head elements on an approximately 630 μm pitch, is capable of reading conventional format 18 and 36 track $CrO_2$ tapes recorded at a lower linear density (25 kfci). As previously discussed, the magnetic tape head assembly of the present invention is suitable for use with any number of read and/or write heads in any combination.

It is to be understood, then, that the present invention has been described in a illustrative manner and that the terminology which has been used is intended to be in the nature of words of description rather than of limitation. As previously stated, many modification and variations of the present invention are possible in light of the above teachings. Therefore, it is also to be understood that, within the scope of the following claims, the present invention may be practiced otherwise than as specifically described.

What is claimed is:

1. A magnetic tape head assembly for use with a magnetic tape storage medium, the assembly comprising:

an interior tape head module having a magnetic gap provided therein, the interior module having 18 tape head elements along the magnetic gap;

a first exterior tape head module having a magnetic gap provided therein, the first exterior module being disposed adjacent to one side of the interior module, the first exterior module having 18 tape head elements along the magnetic gap; and a second exterior tape head module having a magnetic gap provided therein, the second exterior module being disposed adjacent to another side of the interior module, the second exterior module having 18 tape head elements along the magnetic gap;

wherein the distances between consecutive magnetic gaps of the interior and exterior modules are each approximately 0.38 centimeters, the interior and exterior modules together define a tape interface contour, and the tape head assembly is capable of writing and reading a high coercivity, high density metal particle tape media, and reading a low density $CrO_2$ tape media, wherein at least one of the tape head modules includes a read head, and the 18 tape head elements of the at least one of the tape head modules each includes a read element, each read element having a conductive soft adjacent layer and a magneto-resistive film between first and second magnetic shields, the magneto-resistive film located asymmetrically between the first and second magnetic shields and having a thickness of between 500 and 800 Angstroms, the first and second magnetic shields spaced apart from one another at a distance falling within the range of 0.4 to 0.7 micrometers, wherein the ratio of the magnetic moment of the soft adjacent layer to the magneto-resistive film is at least 0.75.

2. The magnetic tape head assembly of claim 1 wherein the first and second exterior tape head modules each comprise a read head, and the 18 tape head elements of the first and second exterior tape head modules each comprises a read element.

3. The magnetic tape head assembly of claim 2 wherein the 18 read elements of the read head are arranged across an approximately 1.27 centimeter span.

4. The magnetic tape head assembly of claim 2 wherein the 18 read elements of each of the read heads each comprise a magneto-resistive film located asymmetrically between first and second magnetic shields.

5. The magnetic tape head assembly of claim 1 wherein the interior tape head module comprises a write head, and the 18 tape head elements each comprises a write element.

6. The magnetic tape head assembly of claim 5 wherein the 18 write elements of the write head are arranged across an approximately 1.27 centimeter span.

7. The magnetic tape head assembly of claim 1 wherein each of the interior and exterior modules are provided with a transverse slot on each side of the magnetic gaps therein.

8. The magnetic tape head assembly of claim 1 wherein the interior tape head module comprises a read head, and the 18 tape head elements each comprises a read element.

9. The magnetic tape head assembly of claim 8 wherein the 18 read elements of the read head each comprise a magneto-resistive film located asymmetrically between first and second magnetic shields.

10. The magnetic tape head assembly of claim 1 wherein the first and second exterior tape head modules each comprise a write head, and the 18 tape head elements of the first and second exterior tape head modules each comprises a write element.

11. A magnetic tape head assembly for use with a magnetic tape storage medium, the assembly comprising:

an interior tape head module having a magnetic gap provided therein, the interior module having 18 tape head elements along the magnetic gap;

a first exterior tape head module having a magnetic gap provided therein, the first exterior module being disposed adjacent to one side of the interior module, the first exterior module having 18 tape head elements along the magnetic gap; and a second exterior tape head module having a magnetic gap provided therein, the second exterior module being disposed adjacent to another side of the interior module, the second exterior module having 18 tape head elements along the magnetic gap;

wherein the distances between consecutive magnetic gaps of the interior and exterior modules are each approximately 0.38 centimeters, each of the interior and exterior modules and the tape head assembly are provided with a transverse slot on each side of the magnetic gaps therein, the 18 tape head elements of each of the interior and exterior modules are arranged across an approximately 1.27 centimeter span, and the tape head assembly is capable of writing and reading a high coercivity, high density metal particle tape media, and reading a low density $CrO_2$ tape media, wherein at least one of the tape head modules includes a read head, and the 18 tape head elements of the at least one of the tape head modules each includes a read element, each read element having a conductive soft adjacent layer and a magneto-resistive film between first and second magnetic shields, the magneto-resistive film located asymmetrically between the first and second magnetic shields and having a thickness of between 500 and 800 Angstroms, the first and second magnetic shields spaced apart from one another at a distance falling within the range of 0.4 to 0.7 micrometers, wherein the ratio of the magnetic moment of the soft adjacent layer to the magneto-resistive film is at least 0.75.

12. The magnetic tape head assembly of claim 11 wherein the first and second exterior tape head modules each comprise a read head, and the 18 tape head elements of the first and second exterior tape head modules each comprises a read element.

13. The magnetic tape head assembly of claim 12 wherein the 18 read elements of each of the read heads each comprise a magneto-resistive film located asymmetrically between first and second magnetic shields.

14. The magnetic tape head assembly of claim 12 wherein the 18 read elements of each of the read heads each comprises a magneto-resistive film having a thickness sufficient to minimize second harmonic distortions and maintain adequate read amplitude.

15. The magnetic tape head assembly of claim 14 wherein the magneto-resistive film has a thickness of between 500 and 800 Angstroms.

16. The magnetic tape head assembly of claim 11 wherein the interior tape head module comprises a write head, and the 18 tape head elements each comprises a write element.

17. The magnetic tape head assembly of claim 11 wherein the interior tape head module comprises a read head, and the 18 tape head elements each comprises a read element.

18. The magnetic tape head assembly of claim 17 wherein the 18 read elements of the read head each comprise a magneto-resistive film located asymmetrically between first and second magnetic shields.

19. The magnetic tape head assembly of claim 17 wherein the 18 read elements of each of the read heads each comprises a magneto-resistive film having a thickness sufficient to minimize second harmonic distortions and maintain adequate read amplitude.

20. The magnetic tape head assembly of claim 11 wherein the first and second exterior tape head modules each comprise a write head, and the 18 tape head elements of the first and second exterior tape head modules each comprises a write element.

* * * * *